(12) United States Patent
Kaddoura

(10) Patent No.: US 10,560,351 B1
(45) Date of Patent: Feb. 11, 2020

(54) NETWORK MONITORING TOOL FOR SUPERCOMPUTERS

(71) Applicant: Architecture Technology Corporation, Eden Prairie, MN (US)

(72) Inventor: Maher Kaddoura, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 237 days.

(21) Appl. No.: 15/857,363

(22) Filed: Dec. 28, 2017

(51) Int. Cl.
*H04L 12/26* (2006.01)
*H04L 12/24* (2006.01)
*H04L 12/733* (2013.01)
*H04L 12/801* (2013.01)

(52) U.S. Cl.
CPC ............ *H04L 43/045* (2013.01); *H04L 41/12* (2013.01); *H04L 41/22* (2013.01); *H04L 43/026* (2013.01); *H04L 45/20* (2013.01); *H04L 47/11* (2013.01)

(58) Field of Classification Search
None
See application file for complete search history.

(56) References Cited

U.S. PATENT DOCUMENTS

| | | | | |
|---|---|---|---|---|
| 7,627,783 B2* | 12/2009 | Archer | ................ | G06F 11/1438 714/15 |
| 7,773,616 B2* | 8/2010 | Reilly | ................... | H04L 45/10 370/396 |
| 8,117,288 B2* | 2/2012 | Bhanot | ................ | G06F 9/5066 709/201 |
| 10,355,940 B2* | 7/2019 | Wolting | ................ | H04L 41/145 |
| 2008/0195892 A1* | 8/2008 | Archer | ................ | G06F 11/1438 714/20 |

* cited by examiner

*Primary Examiner* — Nicholas R Taylor
*Assistant Examiner* — Tania M Pena-Santana
(74) *Attorney, Agent, or Firm* — Eric L. Sophir; Dentons US LLP

(57) ABSTRACT

Disclosed herein are embodiments of a network monitoring device for a supercomputer system having a plurality of supercomputer nodes. The network monitoring device may utilize plug-in software modules to provide network monitoring capabilities related to discovering the network topologies of the supercomputer system, determining network and computing resources that are available for new applications in the supercomputer system, collecting network and computing resources that are being used by running software applications in the supercomputer system, and monitoring running software applications on the supercomputer system.

20 Claims, 6 Drawing Sheets

NETWORK MONITORING TOOL FOR SUPERCOMPUTERS

TECHNICAL FIELD

This application relates generally to the field of network monitoring tools, and more specifically to network monitoring tools configured to monitor a supercomputer nodes network.

BACKGROUND

High-performance computing (HPC) or supercomputer systems use specialized parallel computers and/or nodes to execute applications that require intensive computations, such as physical simulations, climate research, financial modeling, data mining, automotive design, and aerospace design. To run parallel applications efficiently, a supercomputer system needs network monitoring tools for monitoring and generating network data associated with the nodes of the supercomputer system, and data mapping tools that can map these applications to the computational nodes of the supercomputer system in such a way that minimizes cross-node communication while balancing their computational load within the supercomputer system. Various networking monitoring tools have been developed to generate network data that can be utilized by various data mapping tools of the supercomputer system.

A technical challenge within currently available network monitoring tools is that such network monitoring tools are not able to monitor network processes and traffic within the supercomputer system in real-time, and as a result these network monitoring tools are unable to provide continuous stream of monitored network data that can be used by topology-aware tools to map new applications to the supercomputer system in real-time.

SUMMARY

What is therefore desired is a network monitoring tool that monitors the supercomputer system in real-time to perform topologically aware data layout in order to minimize latency and maximize bandwidth among distributed computational nodes in the supercomputer system.

Embodiments disclosed herein solve the aforementioned technological problems to provide a network monitoring device configured to real-time monitor a network between supercomputer nodes of supercomputers of various configurations, notably to small supercomputers, large supercomputers, and next generation supercomputers connected using hierarchical networks via switches. Analysis of real-time data obtained from the network monitoring device allows the supercomputer system operation with minimized latency and maximized bandwidth utilization. Embodiments disclosed herein may solve other technological problems as well.

In an embodiment, a method for monitoring a network between supercomputer nodes is disclosed. The method may include monitoring, by an application monitoring module of a network monitoring device, communication messages between a plurality of processes being executed by a plurality of supercomputer nodes. The method may further include generating, by the application monitoring module, a virtual network topology containing a plurality of virtual communication links between the plurality of processes being executed by the plurality of supercomputer nodes. The method may further include determining, by the application monitoring module, a number of communication messages being transmitted on each of the plurality of virtual communication links and a bandwidth value for each of the plurality of virtual communication links. The method may further include monitoring, by a traffic monitoring module of the network monitoring device, network traffic in a plurality of communication links interconnecting the plurality of supercomputer nodes. The method may further include generating, by the traffic monitoring module of the network monitoring device, a global networking view of the network traffic of the plurality of the supercomputer nodes and the interconnecting plurality of communication links. The method may further include receiving, by a topology mapping module of the network monitoring device, an API call for mapping a new application to the plurality of supercomputer nodes. The method may further include mapping, by the topology mapping module of the network monitoring device, the new application to the plurality of supercomputer nodes that are currently available based upon the virtual network topology and the global networking view of the network traffic.

In another embodiment, a network monitoring device for monitoring a network between supercomputer nodes is disclosed. The network monitoring device may include a non-transitory storage medium configured to store one or more computer program instructions and a processor. The processor may be configured to execute the one or more computer program instructions to implement an application monitoring module, a traffic monitoring module, and a topology mapping module. The application monitoring module is configured to monitor communication messages between a plurality of processes being executed by a plurality of supercomputer nodes, generate a virtual network topology containing a plurality of virtual communication links between the plurality of processes being executed by the plurality of supercomputer nodes, and determine a number of communication messages being transmitted on each of the plurality of virtual communication links and a bandwidth value for each of the plurality of virtual communication links. The traffic monitoring module is configured to monitor network traffic in a plurality of communication links interconnecting the plurality of supercomputer nodes and generate a global networking view of the plurality of the supercomputer nodes and the interconnecting communication links. The topology mapping module is configured to receive an API call for mapping a new application to the plurality of supercomputer nodes, and map the new application to the plurality of supercomputer nodes that are currently available based upon the virtual network topology and the global networking view of the network traffic.

BRIEF DESCRIPTION OF THE DRAWINGS

The accompanying drawings constitute a part of this specification and illustrate embodiments of the subject matter disclosed herein.

DETAILED DESCRIPTION

Figure 1A:
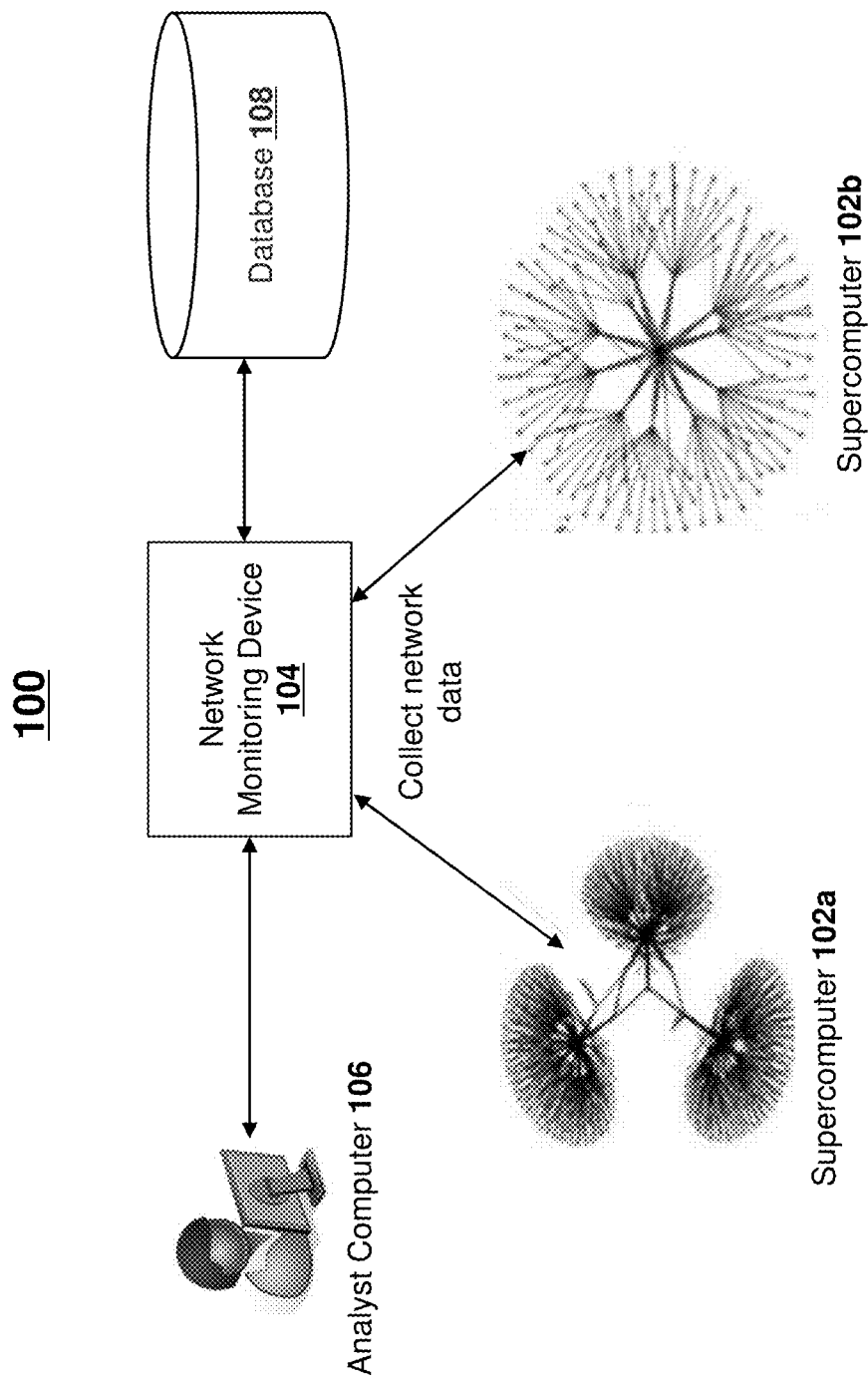
FIG. 1A illustrates components of an enterprise system, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein.

A network monitoring device for a supercomputer system may incorporate a plurality of network interconnect models. The network interconnect models may include a three dimensional torus, a global tree and a global asynchronous signal network. Analysis of real-time data obtained from the network monitoring device allows parallel processing algorithms to exploit these network interconnect models individually or simultaneously, resulting in high performance levels of the operation of the supercomputer system. Additional interactions may derive from the simultaneous use of the multiple processing elements within each supercomputer node of the supercomputer system, which can simultaneously access any or all of these network interconnect models, employing each of the network interconnect model at peak capacity.

A network monitoring device may monitor network activities of a supercomputer system, which is a cluster of parallel, distributed-memory scalable and high performance computer node architectures for achieving high scale computing at decreased cost, power, and footprint. The network monitoring device may correspond to a software suite that may provide an efficient supercomputer system network monitoring tool that enable users, mapping tools, and workload management systems to map software applications into distributed supercomputer nodes of the supercomputer system to minimizes cross-node communication between the distributed supercomputer nodes of the supercomputer system while balancing the computational load between the distributed supercomputer nodes. Non-limiting examples of various applications that may utilize the network monitoring tool of the supercomputer system are physical simulations, climate research, financial modeling, data mining, and automotive and aerospace design.

A network monitoring device may monitor network activities of computer nodes architecture, which allows for a maximum packing density of processing nodes from an interconnect point of view. The network monitoring device may utilize plug-in software modules to provide network monitoring capabilities related to discovering network topologies of the computer nodes, determining network and computing resources that are available for new applications in the computer nodes, collecting network and computing resources that are being used by running software applications in the computer nodes, and monitoring running software applications on the computer nodes. The network monitoring device may further enable third-party tools to access data of the computer nodes that is being monitored and collected through an API by the network monitoring device of the computer nodes.

A network monitoring device may monitor a supercomputer system by directly tapping into one or more switches of the supercomputer system. An adapter may be developed for each type of switch of the supercomputer system. For example, one or more InfiniBand switches may be utilized by the supercomputer system to build different network topologies, such as fat-tree, 2D mesh, 2D/3D torus, and Dragonfly. The InfiniBand switches may include a management tool, such as Mellanox's Unified Fabric Management (UFM), which may be utilized by the network monitoring device to gather all data needed to enable efficient topology-aware mapping for the supercomputer system. UFM may provide comprehensive monitoring of host and switch parameters to gather the data that may include network traffic characteristics, physical information, health counters, and error counters. Such data may be aggregated from multiple supercomputer nodes of the supercomputer system, and then correlated to physical or logical objects of the supercomputer system. In some instances, UFM may aggregate data per application, per specific fabric tenant server group, per switch ports, or any other combination of these. Also, the UFM may enable easy integration of the gathered data with existing third-party management tools via web services API.

A network monitoring device may monitor a network of a cluster of supercomputers designed in parallel, in order to execute several tasks and/or applications simultaneously, and for attaining the highest performances as possible with the known technologies upon its design, in particular in terms of computing rate. The supercomputer may have rates of several peta-flops where the flops (Floating Point Operations Per Second) is a measurement unit for estimating the processing speed of a computer processor node in the supercomputer. The network monitoring device may include one or more software and/or hardware modules such as an application monitoring module, a traffic monitoring module, and a topology mapping module to monitor the network of the supercomputers. Each of the application monitoring module, the traffic monitoring module, and the topology mapping module may include one or more sub-modules to monitor the network of the supercomputers. The application monitoring module may monitor communication of each application being executed by nodes within the supercomputer to build a virtual topology that displays how processes of the supercomputer communicate with each other. The application monitoring module may further compute a number of messages and bandwidth that passes via each virtual link interconnecting the nodes of the supercomputer. The information gathered by the application monitoring module may then be stored in a database, so that the information may be used to map a new application into multiple topologies of the supercomputer. The traffic monitoring module may monitor traffic on each link in the network to determine congestion in the network, and then select the nodes with a lowest traffic to avoid hot spots. The topology mapping module may compute a topology of the network and then display which nodes are currently being used by the running applications within the supercomputer. Using all the data gathered by various modules of the network monitoring tool, the network monitoring tool thereby enables viewing of the network topology of the supercomputer, available bandwidth of the supercomputer, and hot spots within the supercomputer. Such gathered data may also be utilized by topology aware mapping tools to optimally map applications. Also, such data may provide analysts of the supercomputer with a global view of the network of the supercomputer to monitor and manage the efficient and effective operation of the nodes of the supercomputers while running the one or more applications.

Figure 1B:
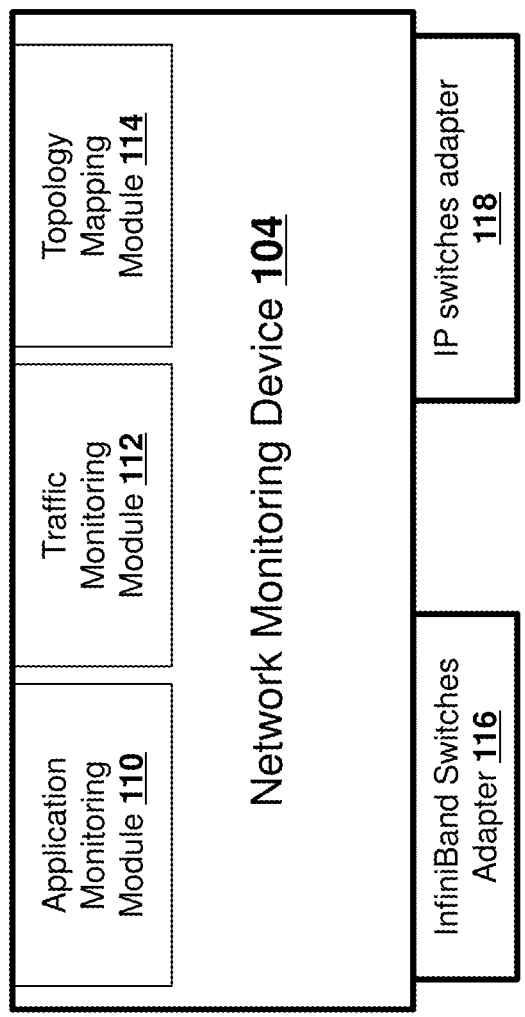
FIG. 1B illustrates an architecture of a network monitoring device of an enterprise system, according to an exemplary embodiment.

FIGS. 1A and 1B illustrate components of an enterprise system 100, according to an exemplary embodiment. The enterprise system 100 may include cluster of supercomputers 102 (such as supercomputer 102a and supercomputer 102b), network monitoring devices 104, analyst computers 106, and databases 108. The supercomputers 102, the network monitoring devices 104, the analyst computers 106, and the databases 108 are connected to each other through one or more communication network platforms to exchange data. The examples of the communication network platform may include, but are not limited to, private or public LAN, WLAN, MAN, WAN, and the Internet. The communication network platform may include both wired and wireless communications according to one or more standards and/or via one or more transport mediums. The communication over the communication network platform may be performed in accordance with various communication protocols such as Transmission Control Protocol and Internet Protocol (TCP/IP), User Datagram Protocol (UDP), and IEEE communication protocols. In one example, the communication network platform may include wireless communications according to Bluetooth specification sets, or another standard or proprietary wireless communication protocol. In another example, the communication network platform may also include communications over a cellular network, including, e.g. a GSM (Global System for Mobile Communications), CDMA (Code Division Multiple Access), EDGE (Enhanced Data for Global Evolution) network.

The enterprise system 100 described herein operates in a cloud-computing environment where the analyst computers 106 are cloud-optimized and transmit a request for monitoring network data associated with one or more processes being executed by the supercomputers 102. The data and application programs of the analyst computers 106 may be stored and executed on the supercomputers 102 accessed over a network cloud. In the cloud computing environment, a web browser on the analyst computers 106 may interface with an application program and/or a process that is executed on the supercomputers 102 and/or the network monitoring devices 104. Through the browser on the analyst computers 106, an analyst user may generate a request for receiving network data associated with execution of the one or more processes and/or applications, and transmit the request to the network monitoring devices 104 and/or the supercomputers 102 via the application program. In some embodiments, the enterprise system 100 described herein operate in a cloud computing environment where the analyst computers 106 may transmit to the network monitoring devices 104 and/or the supercomputers 102 a request for receiving the network data associated with the execution of the one or more processes and/or applications. The data and application programs received from the network monitoring devices 104 and/or the supercomputers 102 to the analyst computers 106 may be stored locally in the analyst computers 106 and executed on local computing resources of the analyst computers 106.

In operation, a network monitoring device 104 comprising one or more software and/or hardware modules may be directly or indirectly connected to a plurality of nodes of a supercomputer 102 to monitor network data such as communication messages between a plurality of processes being executed by the plurality of nodes of the supercomputer 102. Upon analysis of the monitored network data, the network monitoring device 104 may first generate a virtual network topology containing a plurality of virtual communication links between the plurality of processes being executed by the plurality of nodes, and then determine a number of communication messages being transmitted on each of the plurality of virtual communication links and a bandwidth value for each of the plurality of virtual communication links. The network monitoring device 104 may further monitor network traffic in a plurality of communication links interconnecting the plurality of nodes, and then generate a global networking view 122 of the network traffic of the plurality of the nodes and the interconnecting plurality of communication links on a graphical user interface (GUI) of an analyst computer 106. An analyst operating the analyst computer 106 on receiving an API call for mapping a new application to the plurality of supercomputer nodes, the analyst may view GUI of the analyst computer 106 displaying the global networking view 122 of the network traffic to determine optimal and unoccupied subset of physical nodes of the supercomputer 102 determined from an analysis of data in the global networking view 122 of the network traffic that meet the requirements of attributes associated with the new application. Then, the analyst may generate and execute a request for an allocation of the determined subset of the physical nodes to the new application, using for example, a message passing interface (MPI) or a batching system such as the portable batch system (PBS). The GUI of the analyst computer 106 may further be updated to show the modified global networking view 122 displaying the nodes of the supercomputer 102 that are now allocated to the new application. At any time, the analyst may request reallocation of the nodes if the analyst determines that a better allocation of the nodes of the supercomputers 102 may be possible in the network for the new application or any other application being executed by the nodes of the supercomputer 102.

Supercomputers 102 may be any computing and/or telecommunications devices formed by a network of nodes (or supercomputer nodes) interconnected by one or more switches. The network of nodes may be interconnected, in the form of structures, such as grids, lattices or torus configurations via one or more internal or external networks. In some embodiments, a node may be a computer, a server or any other computerized terminal comprising a plurality of processors and/or microprocessors, as well as means of data transmission/reception. The nodes allow receiving or transmitting data (e.g., messages, packets, datagram) by means of one or more network peripherals, such as a network card. The function of the switches is to route the data from or to the nodes to which they are connected. The nodes and the switches comprise a computer network or a graph according to a predetermined topology.

The supercomputer 102 may include a thread, which is a part of a program (such as a user application program, an operating system program or a software development program) that is logically independent from another part of the program and can therefore be executed in parallel with other threads of the program by the nodes of the supercomputer 102. In compiling a program to be run on the supercomputer 102, some compilers of the supercomputer 102 create multiple threads for a program automatically, in addition to those threads that are explicitly identified as portions of the program specifically coded for parallel execution.

The supercomputer 102 may include a compiler, which will produce an object code file for each program module. A program module such as a program source code file contains the source code version for all or part of the program. The object code files from different program modules are linked together into an executable file for the program. The linking of programs together is a common and part of large scale application programs which may consist of many program modules.

Within the supercomputer 102, the executable form of a multithreaded program consists of multiple threads that can be executed in parallel. In the operating system of the supercomputer 102, the representation of the executable form of a program is a process. A process executes a single thread of a program during a single time period. Multiple processes can each execute a different thread or the same thread of a multithreaded program. When multiple processes executing multiple threads of a multithreaded program are simultaneously executing on multiple processors, then parallel processing of a program is being performed. When multiple processes execute multiple threads of a multithreaded program, the processes may share process image. A process image may be the representation in the operating system of the resources associated with process. The process image includes the instructions and data for the process, along with the execution context information for the processor, such as the values in all of the registers, both control registers and data registers, e.g., scalar registers, vector registers, and local registers, and the execution context information for operating system routines called by the process. In the supercomputer 102, the operating system is configured for assigning processes to the different nodes to execute applications, such as physical simulations, climate research, financial modeling, data mining, automotive design, and aerospace design.

Network monitoring devices 104 may be any computing device capable of generating and/or storing network logs, sometimes referred to as log files corresponding to data associated with a network of nodes of the supercomputers 102. The logs may be stored in any machine-readable format (e.g., TXT, XML, HTML, Access Log, Common Log, W3C Log, WAS Log) and may comprise various node data fields containing node data at various OSI layers from inbound IP packets (e.g., source IP address, source Domain Name, source MAC address, source device identifier). In some implementations, the network logs may be stored locally in the particular network appliance, the network monitoring device 104, or any other device that generated the network logs, such as network monitoring software applications configured to detect, manage, and track the network data of the enterprise system 100. In some implementations, the network logs may be stored into a database 108 that is accessible to an analyst computer 106 or the supercomputer 102 via a network.

In some embodiments, the network monitoring device 104 may be directly or indirectly connected and/or tapped into one or more switches utilized by the plurality of nodes of the supercomputer 102 to monitor network data of the supercomputer 102 and then build one or more supercomputer topologies. The one or more supercomputer topologies may be selected from a group comprising superconductor topologies such as a fat-tree, a 2D mesh, a 2D/3D torus, and a Dragonfly. The one or more switches may be connected to each other via one or more adapters such as an InfiniBand switches adapter 116 and an IP switches adapter 118. In some embodiments, the one or more switches may include a management tool to monitor and aggregate network data associated with parameters of the one or more switches of the supercomputer 102 and the plurality of nodes of the supercomputer 102.

In some embodiments, the network monitoring device 104 may include multiple modules to monitor data associated with a network between the plurality of nodes of the supercomputers 102. The modules may be software or hardware modules. In some embodiments, the modules may be a combination of the software modules and the hardware modules. In some embodiments, the modules of the network monitoring device 104 may include an application monitoring module 110, a traffic monitoring module 112, and a topology mapping module 114. Each of these modules of the network monitoring device 104 are configured to perform one or more activities to monitor network data associated with the network between the nodes and the switches of the supercomputers 102. For instance, the application monitoring module 110 is configured to monitor communication between a plurality of processes being executed by the plurality of nodes. During the processing of each of these processes, the processes and/or the plurality of nodes of the supercomputers 102 may communicate to each other. The communication between the processes and/or the plurality of nodes of the supercomputers 102 may include one or more communication messages exchanged between the processes and/or the plurality of nodes of the supercomputers 102. The application monitoring module 110 may further be configured to generate a virtual network topology. The virtual network topology may contain a plurality of virtual communication links between the plurality of processes being executed by the plurality of supercomputer nodes. The application monitoring module 110 may then determine a number of communication messages being transmitted on each of the plurality of virtual communication links and a bandwidth value for each of the plurality of virtual communication links.

In some embodiments, a traffic monitoring module 112 may be configured to monitor network traffic in a plurality of communication links interconnecting the plurality of nodes of the supercomputer 102. The network traffic may correspond to an amount of data moving across the network of the plurality of nodes of the supercomputer 102 at a given point of time. The network data may be encapsulated in network packets, which provide the load in the network of the supercomputer 102. The network traffic data may be used by the traffic monitoring module 112 to generate a global networking view 122 of network data associated with the plurality of the nodes and the interconnecting communication links. In some embodiments, the global networking view 122 may include a weighted undirected graph of the network of the nodes of the supercomputer 102, where vertices of the weighted undirected graph represent physical computational nodes of the supercomputer 102 and edges of the weighted undirected graph represent the network links of the supercomputer 102. In some embodiments, the network monitoring device 104 may assign weights to the edges based on available bandwidth of the associated link within the supercomputer 102.

To generate the global networking view 122 of data associated with the plurality of the nodes and the interconnecting communication links, the traffic monitoring module 112 may analyze an amount and type of network data traffic measured on a particular network in the supercomputer 102. Upon analyzing the amount and the type of traffic on the particular network, the traffic monitoring module 112 may determine congestion in the network of the supercomputer 102. The congestion information may be used by the traffic monitoring module 112 to identify one or more hot spots within the network of the supercomputer 102. Upon the analysis of the network data of the supercomputer 102, the traffic monitoring module 112 may generate the global networking view 122 (in a tabular or graphical format) of the plurality of the nodes and the interconnecting communication links.

A topology mapping module 114 may receive an API call for mapping a new application to the plurality of nodes of the supercomputer 102. Upon receiving the API call, the topology mapping module 114 may process the data/information presented within the global networking view 122 displaying the current network data and traffic to identify currently available nodes and busy nodes of the supercomputer 102. The topology mapping module 114 may then map the new application to the nodes of the supercomputer 102 that are currently available determined from an analysis of the information retrieved from the global networking view 122 of the network data of the supercomputer 102. For instance, the topology mapping module 114 may select one or more available nodes of the plurality of nodes having lowest network traffic to execute the new application such that the bandwidth is maximized and the network latency of the supercomputer 102 is minimized.

In some embodiments, upon receiving the API call for mapping the new application to the plurality of nodes, the traffic monitoring module 112 may generate a graphical user interface on an analyst computer 106 to display a global networking view 122 of the network traffic data showing available nodes and currently busy nodes of the supercomputer 102. In some embodiments, upon receiving the API call for mapping the new application to the plurality of nodes, the topology mapping module 114 may generate a graphical user interface on an analyst computer 106 to display a global networking view 122 of the network traffic data showing available nodes and currently busy nodes of the supercomputer 102. The traffic monitoring module 112 or the topology mapping module 114 may also transmit data associated with the new application to the analyst computer 106. An analyst operating the analyst computer 106 may then select the one or more available nodes having the lowest network traffic based on the analysis of the information retrieved from the global networking view 122 of the network data to execute the new application such that the bandwidth is maximized and the network latency of the supercomputer 102 is minimized.

In some embodiments, upon receiving the API call for mapping the new application to the plurality of nodes, the topology mapping module 114 may execute one or more functions. The topology mapping module 114 may execute a first function that returns an entire weighted undirected graph. The topology mapping module 114 may use the first function to map the new application into the nodes of the supercomputer 102 such that the bandwidth is maximized and the network latency of the supercomputer 10 is minimized.

In some embodiments, upon receiving the API call for mapping the new application to the plurality of nodes, the topology mapping module 114 may execute a second function, which can be used to request a portion of the network of the nodes of the supercomputer 102. For instance, the topology mapping module 114 may generate instructions to search a weighted undirected graph to find an optimal subset of physical computational nodes from all the nodes of the supercomputer 102 that meets the request for requirements associated with the new application. When executing the second function, the topology mapping module 114 may enter a number of nodes and a topology that the second function needs to return in response to the request. The topology mapping module 114 may also include specialized search functions for different type of applications and network topologies. For example, the topology mapping module 114 may map a 2D mesh request into a physical fat-tree network or a hypercube network. The topology mapping module 114 may also leverage one or more algorithms that map topologies to each other in the search process. Thus, a search engine will be able to find an optimal subset of nodes of the supercomputer 10 that meets the requirements of the user request for executing the new application such that the bandwidth is maximized and the network latency of the supercomputer 10 is minimized.

Analyst computers 106 may be computing devices that analysts may use to monitor data associated with networks between nodes of supercomputers 102. An analyst computer 106 may be any computing comprising a processor and capable of performing the various tasks and processes described herein. Non-limiting examples of the analyst computer 106 may include laptops, desktops, servers, tablets, and smartphones. The analyst computer 106 may be coupled via one or more internal or external networks to a database 108 and/or the supercomputers 102. Software executed by the analyst computer 106 permits the analyst to select a record of network and/or traffic data from the database 108 and then review or update network and/or traffic data stored in the database 108 for the associated node of the supercomputer 102.

Figure 1C:
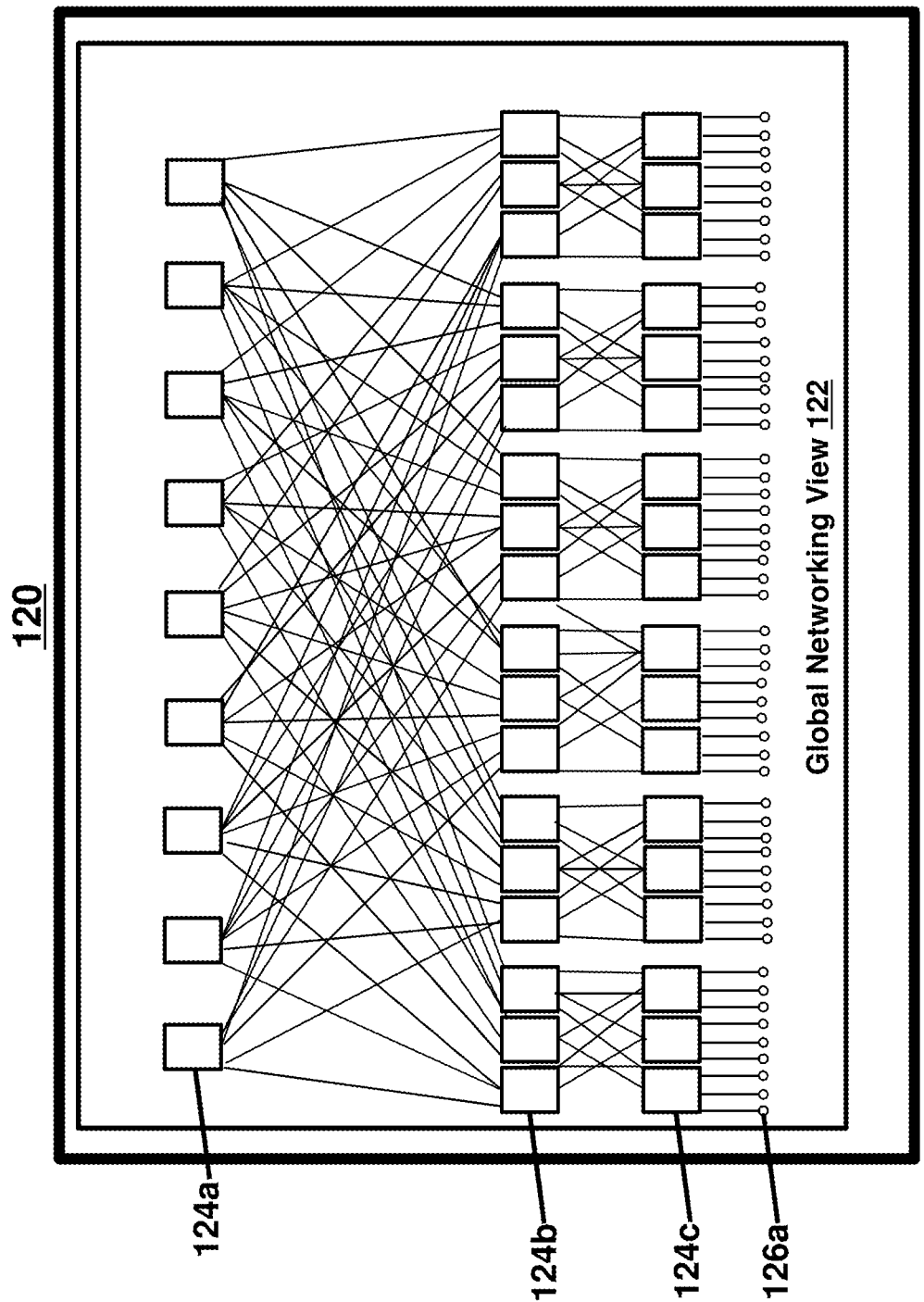
FIG. 1C illustrates a global networking view of a network of a supercomputer, according to an exemplary embodiment.

The analyst computer 106 GUI 120 (as shown in FIG. 1C) may receive a global networking view 122 indicating network topology of the supercomputer 102 and network and/or traffic data associated with switches 124 (FIG. 1C shows exemplary switches 124a-124c) and nodes 126 (FIG. 1C shows an exemplary node 126a) of the supercomputer 102. The network and/or traffic data may indicate bandwidth values and hot spots corresponding to each of the plurality of virtual communication links and/or communication links interconnecting the switches 124 and the nodes 126 of the supercomputer 102. Such network and/or traffic data may be used by the analyst computer 106 to measure the performance of topology-aware mapping tools, for debugging network problems associated with the nodes of the supercomputer 102, and/or generate and prioritize alerts associated with the network and/or traffic data.

In some embodiments, the analyst computer 106 GUI may receive alerts associated with the network and/or traffic data that is related to subject matter (e.g., type of the node of the supercomputer 102) or procedural role (e.g., time-sensitive alert based on hot spots or bandwidth value) of the respective analyst. In some implementations, an alert associated with the network and/or traffic data may have a data field identifying a nature of the potential traffic risk and another data field indicating a time-sensitive nature or customer-sensitive nature of the potential traffic risk. Based on these data fields, the analyst computer 106 may receive alerts having subject matter or procedural data fields associated with the analyst credentials. For instance, the analyst credentials of an analyst specializing in time sensitive alerts would indicate to the analyst computer 106 that the analyst computer 106 should retrieve and present the alerts having a data field indicating that the particular alert is time sensitive. In some implementations, the alerts may be stored into dedicated databases or sub-databases of the database 108, where each sub-database is configured to store alerts with certain types of alerts. In such implementations, the analyst computer 106 may be limited to accessing certain sub-databases according to the analyst credentials of the analyst operating the analyst computer 106. Similarly, the analyst computer 106 may receive updates or notification messages that the analyst computer 106 presents on a GUI 120 to the analyst. A node 126a of the supercomputer 102, the database 108, or other server of the system 100 may trigger and transmit the notification to each analyst computer 106 having analyst credentials with access attributes indicating the role of the analyst. For instance, an analyst may have analyst credentials with attributes that indicate the analyst specializes in handling time-sensitive alerts associated with a particular type of a node 126a. When a new alert is generated or an existing alert is updated with a data field indicating the alert is time sensitive, the node 126a of the supercomputer 102, the database 108, or other server of the system 100 may transmit a notification message to the analyst computer 106 of the analyst.

In some implementations, an analyst computer 106 may have a GUI that allows an analyst to mark or tag the alert associated with the network data. A data field in the record of the alert is then updated to reflect the tag inputted by the analyst computer 106. In some instances, the tag reflects an analyst's concern that the alert may contain data fields that could be cross-referenced and found in another alert. The node 126a of the supercomputer 102 or other server of the system 100 may then perform various forms of processing on the data fields, such as identifying which, if any, other alerts contain the same data in corresponding data fields. In some embodiments, the node 126a of the supercomputer 102, the analyst computer 106, or other device of the system 100 may execute various models that indicate to the node 126a of the supercomputer 102 that the alert should be tagged. Alerts may be tagged automatically when data fields in the alert matches a threshold number of data fields of a given model.

Databases 108 may be hosted on one or more computing devices such as supercomputers 102, where the database 108 may store data records associated with various aspects of the application services offered to end users and/or analysts operating the supercomputer 102. Non-limiting examples of what may be stored in the database 108 may include analyst user records that may comprise data fields describing analyst users, e.g., user data, such as user credentials (e.g., username, passwords, biometrics, encryption certificates), user account data, user roles, or user permissions; network records that may comprise machine-readable computer files (e.g., word processing files), parsed portions of such computer files, or metadata associated with computer files; and application data that may include software instructions executed by nodes of the supercomputer 102 or data used by the such applications executed by the supercomputer 102. The database 108 may be hosted on any number of supercomputers 102 comprising a non-transitory machine-readable storage medium and capable of performing the various tasks described herein. As shown in FIG. 1A, the database 108 may be accessed by the nodes 126a of the supercomputer 102 and/or other servers and devices of the system 100 via one or more networks. The database 108 may be hosted on the same physical computing device functioning as the supercomputer 102 and/or functioning as other servers and devices of the system 100.

The databases 108 may include a non-transitory machine-readable storage media capable of receiving, storing, updating network data associated with the nodes 126a of the supercomputer 102. The databases 108 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the nodes of the supercomputer 102 and/or analyst computers 106.

In some embodiments, a memory of the databases 108 may be a non-volatile storage device for storing alert element data and instructions, to be used by a processor of the nodes 126a of the supercomputer 102. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, a memory of databases 108 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Figure 2:
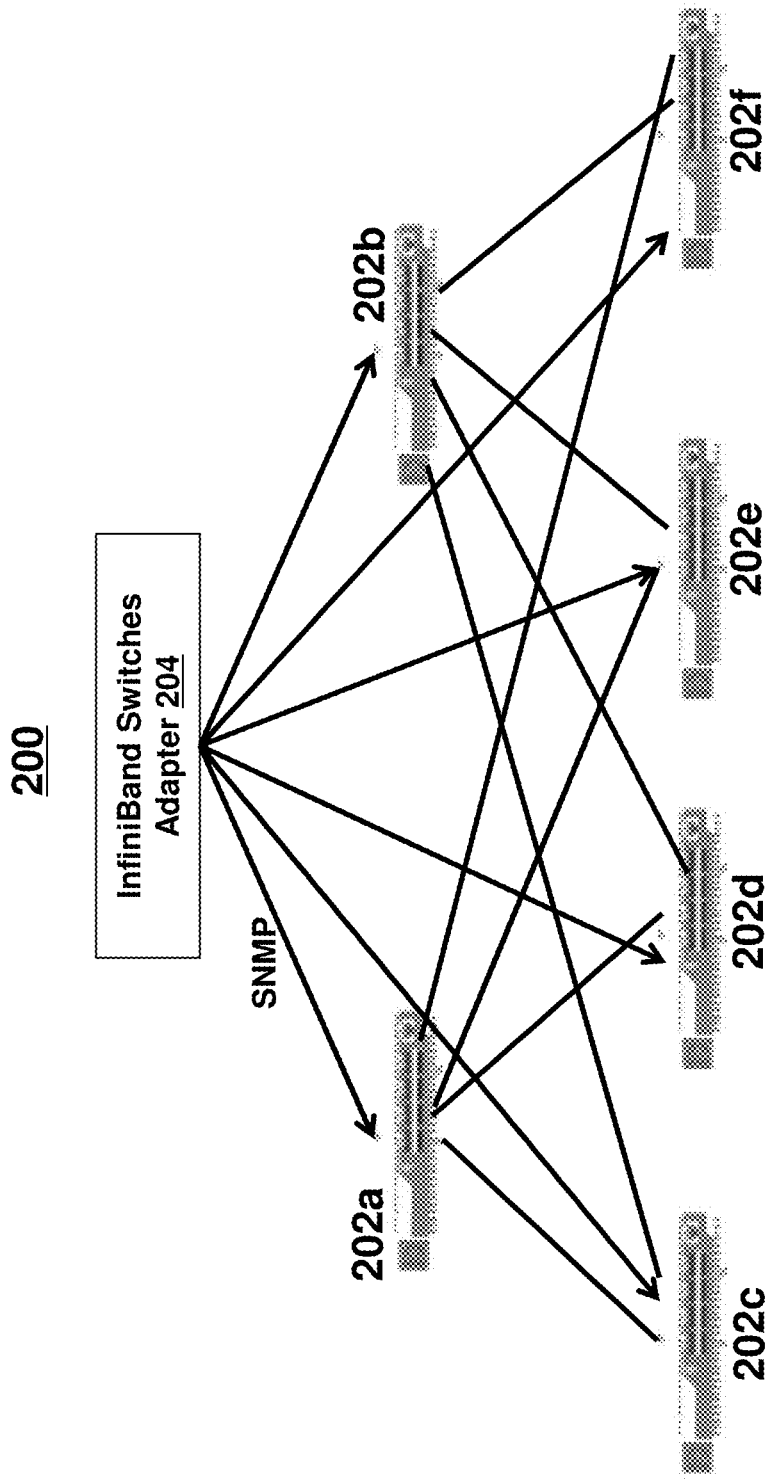
FIG. 2 illustrates a system for monitoring a fat-tree network, according to an exemplary embodiment.

FIG. 2 illustrates a system 200 for monitoring a fat-tree network of a supercomputer, according to an exemplary embodiment. FIG. 2 will be explained in conjunction with the FIG. 1. The system 200 is configured to improve load distribution and/or spreading in the fat-tree networks or other highly regular switching hierarchies that have multiple paths between nodes (processors) of the supercomputer in the network. The load distribution or load spreading may be a technique by which bandwidth is more effectively utilized in the nodes of the supercomputer and overall performance of the supercomputer is improved in a network of the supercomputer. The load distribution and load spreading techniques may consider a number of next hops on a shortest path to a given destination node in the network of the supercomputer as well as the overall distribution of traffic between the nodes in the network of the supercomputer.

A fat-tree network is a network where the nodes are hierarchically organized into a series of levels. One or more core nodes may reside at a top level of the hierarchy, and several host nodes may reside at a lowest level of the hierarchy. In the fat-tree network, the bandwidth is allocated among the levels of a tree topology such that the nodes at higher levels in the tree have access to greater amounts of bandwidth for data transmission through the network. Multiple nodes may be used to emulate fat links at the higher levels of a fat-tree network, thus creating multiple paths between the host nodes. By having multiple paths between the host nodes, more bandwidth may be available between the host nodes. In one non-limiting example case, in the fat-tree network, the nodes may be connected to a bottom layer. The nodes may be interconnected to each other via switches 202a-202f (hereinafter 202). For each switch 202 interconnecting the nodes, a number of links going down to its sibling switches 202 is equal to the number of links going up to its parent switch 202 in the upper level. As a result, the links between the nodes get "fatter" towards a top of the fat-tree network, and the switch 202 in the root of the fat-tree network has most links compared to any other switch below it.

The switches 202 may be InfiniBand switches, which are specified by the InfiniBand™ architecture. In some embodiments, the InfiniBand switches 202 may be implemented within a single switching entity, for example, a single switching chip, a physical switching unit, and the like. In some embodiments, the fat-tree network may be built using any number of InfiniBand switches 202, where the InfiniBand switch 202 may be a 24-port Mellanox Anafa-II InfiniBand Switch, manufactured by Mellanox Technologies. The present disclosure is not limited to the use of this InfiniBand switch 202 and another type or model of InfiniBand switch may be used and be within the scope of the invention. In some embodiments, each of plurality of InfiniBand switches 202 may be coupled to the nodes, via node ports. For example, the InfiniBand switch 202 may include a plurality of node ports via which the InfiniBand switch 202 may be coupled to one or more of a plurality of nodes.

An adapter 204 (such as InfiniBand Host Channel Adapter (HCA)) may be connected to the switches 202 (such as InfiniBand switches) to provide a high performing interconnect solution for the nodes of the supercomputer. The adapter 204 may be a low latency and high bandwidth interconnector for the nodes of the supercomputer to achieve significant performance improvements resulting in reduced completion time and lower cost per operation for parallelized applications of the supercomputer.

Management tools (such as Unified Fabric Management (UFM) software of Mellanox) for the switches 202 may be used to collect network data from the switches 202 of the supercomputer in order to monitor communications which occur in a network of the nodes of the supercomputer where each communication being effected by a transmission of one or more packets among two or more communicating nodes of the supercomputer. The management tools may passively detect the contents of packets and in real time from the supercomputer, and communication information associated with multiple protocols may be derived from the packet contents within the supercomputer.

As an illustration of an embodiment of the present disclosure, traffic may traverse fat-tree network. Traffic (for example, a packet) originating at any node can enter a first InfiniBand switch 202 through a node port, passing through an internal switch link. The packet then proceeds to a second InfiniBand switch 202. The packet crosses through internal switch link at the second InfiniBand switch 202, and back to the first InfiniBand switch 202 via one of a plurality of links. The packet can then proceed to another node coupled to the first InfiniBand switch 202. In order to monitor network links and application traffic between the nodes of the supercomputer, a network monitoring device may be used within the supercomputer to gather data that is needed to monitor the network links and the application traffic between the nodes of the supercomputer. The network monitoring device may use a simple network management protocol (SNMP) to monitor network links and application traffic between the switches 202 (such as InfiniBand switches and IP switches) and the nodes of the supercomputer. SNMP may be supported by an Internet User Datagram Protocol (UDP) and Internet Protocol (IP) over communications environments such as serial links, Ethernet, etc. within the nodes of the supercomputer. The SNMP Network Management Framework may consists of three major components, such as, (1) the mechanisms used for describing and naming objects for the purpose of management; (2) the core set of managed objects for the Internet suite of protocols; and (3) the protocol for accessing managed objects to monitor the network links and the application traffic between the switches 202 and the nodes of the supercomputer.

Figure 3:
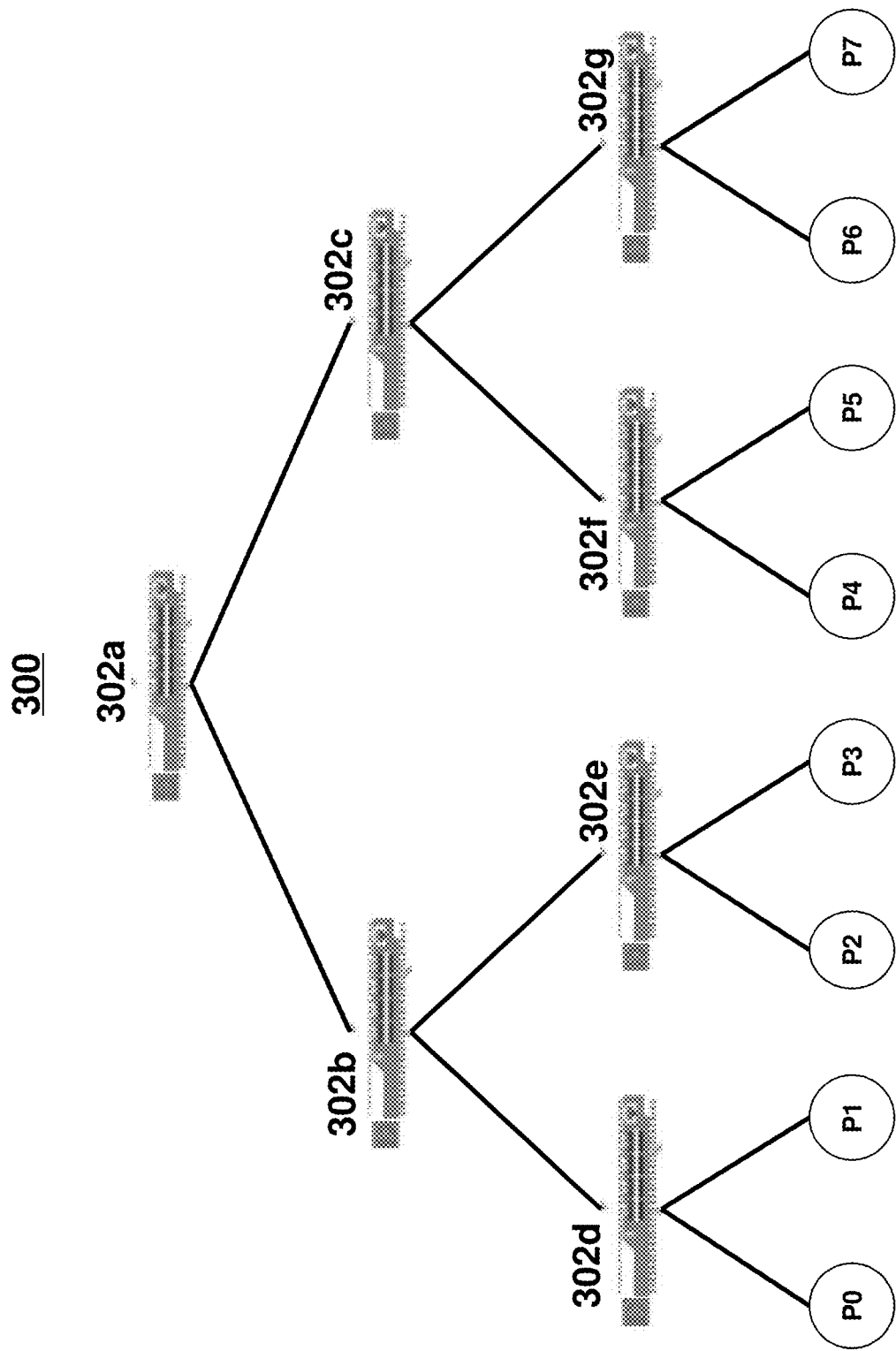
FIG. 3 illustrates a network of nodes of a supercomputer, according to an exemplary embodiment.

FIG. 3 illustrates a network of nodes of a supercomputer 300, according to an exemplary embodiment. The parallel computing structures referred to as high performance computing (HPC) or the supercomputer 300 interconnect large numbers of compute nodes/processors (shown as P0-P7), in the form of structures, such as mesh, torus, and tree configurations. The compute nodes/processors (shown as P0-P7) may be interconnected to each other via switches 302. The switches 302 may be implemented within a switching entity, for example, a switching chip, a physical switching unit, and the like.

The supercomputer 300 may be capable of achieving petaflop with up to million cores, or thousands nodes, or hundreds racks, and may be based upon System-On-a-Chip technology, where each processing node comprises a single Application Specific Integrated Circuit (ASIC). The ASIC nodes are interconnected by a network that optimally maximize packet communications throughput and minimize latency. The network may include a direct memory access network interface.

A network monitoring device may detect, monitor, report, and manage network and congestion data in the supercomputer 300. The network monitoring device may use software modules and/or multi-port switches in the supercomputer 300 with port controllers that collect port traffic statistics and/or network data statistics. The network monitoring device may periodically gather the port statistics and/or the network data statistics, and then processes the gathered statistics to identify bandwidth value, hot spots, and congestion at the ports and/or within the network. A database is maintained within the network with an entry for each port and contains counters for the types of network traffic/congestion. The counters for ports in the network that are identified as congested are incremented to reflect the detected traffic congestion. The network monitoring device may further include a management platform that periodically requests copies of the port traffic data from the switches.

In some embodiments, the network monitoring device may include a software module such as an application monitoring software, which will generate for each running application on the processors (P0-P7) of the supercomputer 300, tables that summarize the communication between the processors (P0-P7). The tables will display a bandwidth value and a number of messages that the processors (P0-P7) exchanged between them. The network monitoring device may store the generated table in a database so that information within the table may be used by an analyst to map new applications onto different topologies of the supercomputer 300. The Table 1 shows an example of a table generated by the application monitoring software displaying a number of messages that an application's processors (P0-P7) exchanged between them.

TABLE 1

| Processor | P0 | P1 | P2 | P3 |
|---|---|---|---|---|
| P0 | 0 | 3000 | 3000 | 1200 |
| P1 | 3000 | 0 | 600 | 0 |
| P2 | 1000 | 500 | 0 | 400 |
| P3 | 5000 | 0 | 200 | 0 |

Based on analysis of the information in the Table 1, the network monitoring device may specify that the processors P0, P1, and P2 are busy and processor P3 has limited bandwidth. In some embodiments, an analyst may perform its own analysis of the information in the table 1 to identify one or more processors from a list of the processors (P0-P7) that are busy and available.

In some embodiments, the network monitoring device may generate a global view of a network of the supercomputer 300 in a graphical or tabular format showing a topology of the supercomputer 300, link utilization of the processors (P0-P7), a list of the processors (P0-P7) that are free, a list of the processors (P0-P7) that are busy, available bandwidth between the processors (P0-P7), and a number of hops that separates any two processors (P0-P7). In some embodiments, the network monitoring device may store all information of the global view in the database so that information within the global view may be used by the analyst to map new applications onto different topologies of the supercomputer 300. In some embodiments, the supercomputer 300 may be provided with an application programming interface (API) to allow third-party tools and libraries to access the data available in the global view from the database that is generated by the network monitoring device.

In some embodiments, the network monitoring device may analyze the network and congestion data available within the global view, and then determine an optimal number of physical computational processors (P0-P7) to be allocated for each current application running within the supercomputer 300 that maximizes bandwidth and minimizes latency. For instance, upon the reviewing the global view data of the network, the network monitoring device may determine that currently processors (P3, P4, P5, and P6) may be executing a first application, but based on the analysis of the network and congestion data, the network monitoring device may determine a new combination of the processors (P4, P5, P6 and P7) for execution of the first application instead of the current processors (P3, P4, P5, and P6). Then the the network monitoring device may generate instructions to replace the processor P7 with the processor P6 for execution of the first application, and thereby maximizing bandwidth and minimizing latency of resources of the supercomputer 300.

Figure 4:
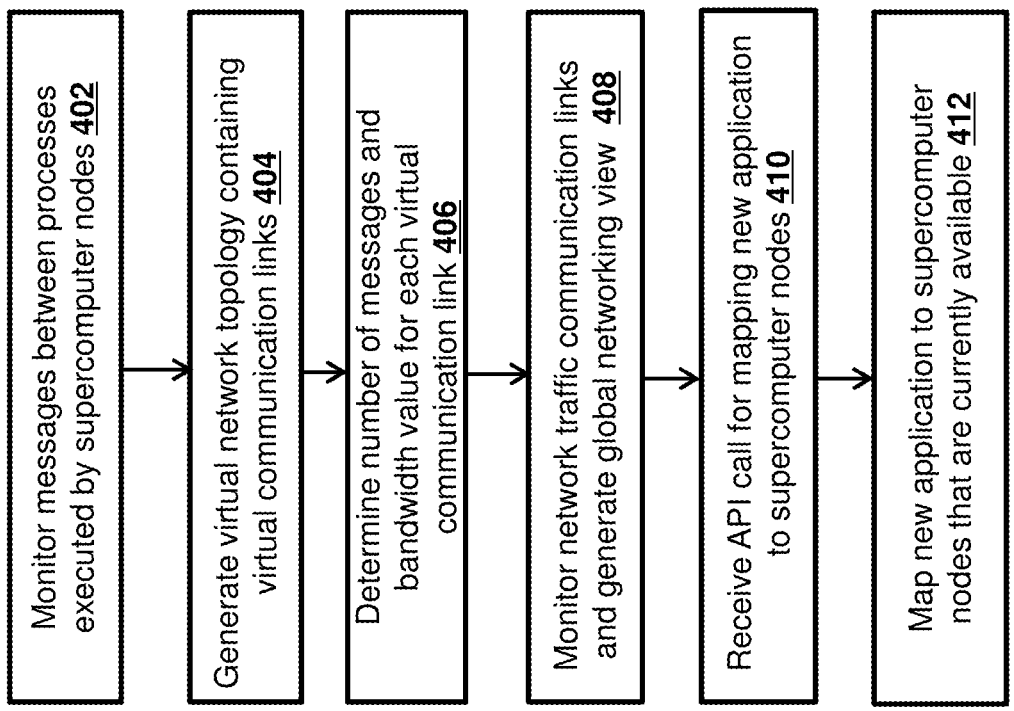
FIG. 4 illustrates execution of a method for monitoring a network between nodes of a supercomputer, according to an exemplary embodiment.

FIG. 4 shows execution steps of monitoring a network between nodes of a supercomputer, according to an exemplary method 400. The exemplary method 400 shown in FIG. 4 comprises execution steps 402, 404, 406, 408, 410, and 412. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 400 of FIG. 4 is described as being executed by a single monitoring tool, referred to as a network monitoring device having one or more processors and/or software modules in this exemplary embodiment. However, one having skill in the art will appreciate that, in some embodiments, steps may be executed by any number of monitoring tools operating in a distributed cloud computing environment. In some cases, a monitoring tool executing one or more steps may be programmed to execute various other, unrelated features, where such monitoring tool does not need to be operating strictly as the network monitoring device described herein.

At step 402, an application monitoring module of a network monitoring device monitors communication messages between a plurality of processes being executed by a plurality of supercomputer nodes. In some embodiments, each of the plurality of supercomputer nodes may include one or more switches. In some embodiments, each of the plurality of supercomputer nodes may be connected to the one or more switches. In some embodiments, each of the plurality of supercomputer nodes may be wirelessly or physically connected to the one or more switches. The one or more switches may be utilized by the plurality of supercomputer nodes to build one or more network topologies. The one or more network topologies may be selected from a group comprising network topologies such as a fat-tree, a 2D mesh, a 2D/3D torus, and a Dragonfly. In some embodiments, the network monitoring device may be tapped into the one or more switches of the plurality of supercomputer nodes to monitor the network and/or the plurality of processes being executed by the plurality of supercomputer nodes.

At step 404, an application monitoring module generates a virtual network topology. The virtual network topology may contain a plurality of virtual communication links. The plurality of virtual communication links may be between the plurality of processes being executed by the plurality of supercomputer nodes.

In some embodiments, a virtual network configuration may be of multiple types. One type of virtual network configuration may remain completely in the cloud, and known as cloud-only configuration, and the other type of virtual network configuration may allow both cloud-based and on-premises nodes to communicate. The cloud-only virtual network may be useful when an entire supercomputer and its various tiers that reside in cloud, and there is no need for the supercomputer virtual nodes to communicate with other supercomputer nodes in different networks. The cloud-only virtual networks are virtual networks that reside entirely in cloud. The virtual network reconfiguration may accommodate the traffic that changes significantly between the nodes. By reconfiguring the virtual network, the network accommodates the traffic between the nodes even when the traffic pattern between the nodes changes significantly. The reconfigure may have a large impact on the traffic passing the reconfigured paths. The number of reconfigured paths may depend on the generated virtual network topology before the reconfiguration.

At step 406, an application monitoring module determines a number of communication messages being transmitted on each of the plurality of virtual communication links and a bandwidth value for each of the plurality of virtual communication links.

In some embodiments, the application monitoring module may work in conjunction with tools of one or more switches to gather data associated with each of the plurality of virtual communication links. For instance, the one or more switches may include a management tool, and the management tool may be configured to monitor and aggregate data associated with parameters of the one or more switches and/or the parameters of the plurality of supercomputer nodes. The gathered data may include, but is not limited to, network traffic characteristics, physical information, health counters, and error counters. In some embodiments, the management tool may be configured to aggregate data per application running on the plurality of supercomputer nodes. In some embodiments, the management tool may be configured to aggregate data per specific fabric tenant node group of the plurality of supercomputer nodes. In some embodiments, the management tool may be configured to aggregate data per switch port of the one or more switches of the supercomputer. The application monitoring module upon the analysis of the aggregated data may determine a number of communication messages being transmitted on each of the plurality of virtual communication links and a bandwidth value for each of the plurality of virtual communication links.

At step 408, a traffic monitoring module of the network monitoring device monitors network traffic in a plurality of communication links interconnecting the plurality of supercomputer nodes. The network traffic may correspond to an amount of data moving across the network of the plurality of supercomputer nodes at a given point of time. The network data may be encapsulated in network packets, which provide the load in the network.

The network traffic data may be used by a sub-module of the traffic monitoring module such as a network traffic measurement module to measure an amount and type of traffic on a particular network. Upon measuring the amount and the type of traffic on a particular network, the traffic monitoring module may then determine congestion in the network. The congestion information may then be used to identify one or more hot spots within the network.

The network traffic data may be used by a sub-module of the traffic monitoring module such as a network traffic control module configured for managing, prioritizing, controlling, or reducing the network traffic. For instance, using the network traffic data, the traffic monitoring module may determine one or more supercomputer nodes of the plurality of supercomputer nodes currently being utilized by running one or more applications and one or more supercomputer nodes of the plurality of supercomputer nodes currently free. The traffic monitoring module may further determine a number of hops separating any two supercomputer nodes of the plurality of supercomputer nodes. The traffic monitoring module may then re-allocate supercomputer nodes for running the one or more applications based on analysis of a location of currently utilized and free nodes such that the overall network traffic is then reduced and network latency is minimized.

The network traffic data may be used by a sub-module of the traffic monitoring module such as a network traffic simulation module configured to measure an efficiency of the communications network based on a current output being produced by the supercomputer in response to utilization of current resources derived from the network traffic data.

In some embodiments, the traffic monitoring module may store gathered network traffic data in a database. The traffic monitoring module may query the database to retrieve the gathered data by the traffic monitoring module, and then generate a global networking view of the network traffic of the plurality of the supercomputer nodes and the interconnecting plurality of communication links based on the gathered data. In some embodiments, the traffic monitoring module may generate the global networking view in a graphical format or a tabular format showing a topology of the supercomputer, link utilization of the supercomputer nodes, a list of the supercomputer nodes that are free, a list of the supercomputer nodes that are busy, available bandwidth between the supercomputer nodes, and a number of hops that separates any two supercomputer nodes.

At step 410, a network monitoring device receives an API call for mapping a new application to the plurality of supercomputer nodes. Upon receiving the API call, the traffic monitoring module the network monitoring device may generate a graphical user interface on an analyst computing device to display the global networking view of the current network data and traffic showing currently available and busy supercomputer nodes of the plurality of supercomputer nodes.

At step 412, a topology mapping module of a network monitoring device maps the new application to the plurality of supercomputer nodes that are currently available determined from an analysis of the information retrieved from the global networking view of the network data. For instance, the network monitoring device may select one or more available supercomputer nodes of the plurality of supercomputer nodes having lowest network traffic to execute the new application. In some embodiments, an administrator and/or an analyst of the supercomputer may select the one or more available supercomputer nodes of the plurality of supercomputer nodes having the lowest network traffic based on the analysis of the information retrieved from the global networking view of the network data to execute the new application such that the bandwidth is maximized and the network latency of the supercomputer is minimized.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for monitoring a supercomputer nodes network:
monitoring, by an application monitoring module of a network monitoring device, communication messages between a plurality of processes being executed by a plurality of supercomputer nodes;
generating, by the application monitoring module of the network monitoring device, a virtual network topology containing a plurality of virtual communication links between the plurality of processes being executed by the plurality of supercomputer nodes based upon the monitoring of the communication messages;
determining, by the application monitoring module of the network monitoring device, a number of the communication messages being transmitted on each of the plurality of virtual communication links and a bandwidth value for each of the plurality of virtual communication links;
monitoring, by a traffic monitoring module of the network monitoring device, network traffic in a plurality of communication links interconnecting the plurality of supercomputer nodes;
generating, by the traffic monitoring module of the network monitoring device, a global networking view of the network traffic of the plurality of the supercomputer nodes and the interconnecting plurality of communication links;
receiving, by a topology mapping module of the network monitoring device, an API call for mapping a new application to the plurality of supercomputer nodes; and
mapping, by the topology mapping module of the network monitoring device, the new application to the plurality of supercomputer nodes that are currently available based upon the virtual network topology and the global networking view of the network traffic.

2. The method according to claim 1, further comprising:
selecting, by the network monitoring device, one or more supercomputer nodes of the plurality of supercomputer nodes having lowest network traffic to execute one or more processes of the plurality of processes.

3. The method according to claim 1, further comprising:
determining, by the traffic monitoring module, congestion in the network based on the network traffic in the plurality of communication links to identify one or more hot spots.

4. The method according to claim 1, further comprising:
determining, by the traffic monitoring module, one or more supercomputer nodes of the plurality of supercomputer nodes currently being utilized by one or more applications based on the network traffic.

5. The method according to claim 1, wherein each of the plurality of supercomputer nodes is connected to one or more switches, and wherein the network monitoring device is tapped into the one or more switches of the plurality of supercomputer nodes to monitor the network.

6. The method according to claim 5, wherein the one or more switches are utilized by the plurality of supercomputer nodes to build one or more network topologies comprising at least one of a fat-tree, a 2D mesh, a 2D/3D torus, and a Dragonfly.

7. The method according to claim 6, wherein the one or more switches comprises a management tool to monitor and aggregate data associated with parameters of the one or more switches and the plurality of supercomputer nodes, and wherein the data comprises network traffic characteristics, physical information, health counters, and error counters.

8. The method according to claim 7, wherein the data is aggregated per application, per specific fabric tenant server group, or per switch ports of the one or more switches and the plurality of supercomputer nodes.

9. The method according to claim 1, further comprising:
determining, by the network monitoring device, a number of hops separating any two supercomputer nodes of the plurality of supercomputer nodes.

10. The method according to claim to claim 1, further comprising:
generating, by the network monitoring device, a graphical user interface on an analyst computing device to display the global networking view of the network traffic showing available supercomputer nodes and currently busy supercomputer nodes of the plurality of supercomputer nodes.

11. A network monitoring device for monitoring a network between supercomputer nodes comprising:
a non-transitory storage medium configured to store one or more computer program instructions;
a processor configured to execute the one or more computer program instructions to implement:
an application monitoring module configured to:
monitor communication messages between a plurality of processes being executed by a plurality of supercomputer nodes;
generate a virtual network topology containing a plurality of virtual communication links between the plurality of processes being executed by the plurality of supercomputer nodes; and
determine a number of communication messages being transmitted on each of the plurality of virtual communication links and a bandwidth value for each of the plurality of virtual communication links;
a traffic monitoring module configured to:
monitor network traffic in a plurality of communication links interconnecting the plurality of supercomputer nodes; and
generate a global networking view of the plurality of the supercomputer nodes and the interconnecting communication links; and
a topology mapping module configured to:
receive an API call for mapping a new application to the plurality of supercomputer nodes; and
map the new application to the plurality of supercomputer nodes that are currently available based upon the virtual network topology and the global networking view of the network traffic.

12. The network monitoring device according to claim 11, wherein the traffic monitoring module is further configured to select one or more supercomputer nodes of the plurality of supercomputer nodes having lowest network traffic to execute one or more processes of the plurality of processes.

13. The network monitoring device according to claim 11, wherein the traffic monitoring module is further configured to determine congestion in the network based on the network traffic in the plurality of communication links to identify one or more hot spots.

14. The network monitoring device according to claim 11, wherein the topology mapping module is further configured to determine one or more supercomputer nodes of the plurality of supercomputer nodes currently being utilized by running one or more applications based on the network traffic.

15. The network monitoring device according to claim 11, wherein each of the plurality of supercomputer nodes is connected to one or more switches, and wherein the network monitoring device is tapped into the one or more switches of the plurality of supercomputer nodes to monitor the network.

16. The network monitoring device according to claim 15, wherein the one or more switches are utilized by the plurality of supercomputer nodes to build one or more network topologies comprising one of a fat-tree, a 2D mesh, a 2D/3D torus, and a Dragonfly.

17. The network monitoring device according to claim 16, wherein the one or more switches comprises a management tool to monitor and aggregate data associated with parameters of the one or more switches and the plurality of supercomputer nodes, and wherein the data comprises network traffic characteristics, physical information, health counters, and error counters.

18. The network monitoring device according to claim 17, wherein the data is aggregated per application, per specific fabric tenant server group, or per switch ports of the one or more switches and the plurality of supercomputer nodes.

19. The network monitoring device according to claim 11, wherein the application monitoring module is further configured to determine a number of hops separating any two supercomputer nodes of the plurality of supercomputer nodes.

20. The network monitoring device according to claim 11, wherein the topology mapping module is further configured to generate a graphical user interface on an analyst computing device to display the global networking view of the network traffic showing available supercomputer nodes and currently busy supercomputer nodes of the plurality of supercomputer nodes.

* * * * *